(12) United States Patent
Gkizelis et al.

(10) Patent No.: US 11,559,841 B2
(45) Date of Patent: Jan. 24, 2023

(54) ELECTROMECHANICAL SHEARS FOR VERTICAL CUTTING

(71) Applicant: STAMATIS GIZELIS S.A, Schimatari Viotias (GR)

(72) Inventors: Evangelos Gkizelis, Schimatari Viotias (GR); Ioannis Seisakis, Schimatari Viotias (GR)

(73) Assignee: STAMATIS GIZELIS S.A., Schimatari Viotias (GR)

( * ) Notice: Subject to any disclaimer, the term of this patent is extended or adjusted under 35 U.S.C. 154(b) by 4 days.

(21) Appl. No.: 17/281,118

(22) PCT Filed: Oct. 11, 2019

(86) PCT No.: PCT/GR2019/000069
§ 371 (c)(1),
(2) Date: Mar. 29, 2021

(87) PCT Pub. No.: WO2020/074931
PCT Pub. Date: Apr. 16, 2020

(65) Prior Publication Data
US 2021/0354215 A1 Nov. 18, 2021

(30) Foreign Application Priority Data

Oct. 12, 2018 (GR) .............................. 20180100465
Feb. 6, 2019 (GR) .............................. 20190100068

(51) Int. Cl.
*B23D 15/12* (2006.01)
*B23D 15/08* (2006.01)
*B23D 35/00* (2006.01)

(52) U.S. Cl.
CPC .............. *B23D 15/12* (2013.01); *B23D 15/08* (2013.01); *B23D 35/005* (2013.01)

(58) Field of Classification Search
CPC ........ B23D 15/12; B23D 35/00; B23D 15/08; B26D 1/09; B26D 1/095; B26D 1/085; B26D 1/06; B26D 1/08
See application file for complete search history.

(56) References Cited

U.S. PATENT DOCUMENTS 2,599,591 A * 6/1952 Spiller ..................... B26D 1/08
  83/381
2,962,069 A * 11/1960 Olsen ....................... B26D 1/06
  83/717

(Continued)

FOREIGN PATENT DOCUMENTS

DE   WO9500301   *  4/1993  ............. B26D 15/08
DE      1520649   *  4/2005  ............. B23D 35/00

(Continued)

OTHER PUBLICATIONS

International Search Report of PCT/GR2019/000069; Search completed on Jan. 21, 2020, Vaglienti, Giovanni.

*Primary Examiner* — Evan H MacFarlane
*Assistant Examiner* — Fernando A Ayala
(74) *Attorney, Agent, or Firm* — DP IP Group; Franco De Liguori

(57) ABSTRACT

The electromechanical vertical cutting shear (1) comprises an electric servomotor (4) combined with a gear reducer (5) at least one shaft (6) bearing one or more spools (7), at least one motion transmission means (8) which is connected to a guillotine (11), and a cutting system comprising at least a pair of knives (12). The electromechanical shear (1) comprises a pulley system (9) for every motion transmission means (8).

14 Claims, 8 Drawing Sheets

(56) References Cited

U.S. PATENT DOCUMENTS

| | | | | |
|---|---|---|---|---|
| 3,282,141 | A | * | 11/1966 | Gautron .................... B60L 9/30 83/640 |
| 3,653,757 | A | * | 4/1972 | Newcomb .......... G03G 15/6523 83/205 |
| 3,889,562 | A | * | 6/1975 | Schiesser ............... B26D 3/003 83/167 |
| 4,813,994 | A | * | 3/1989 | Kulig ....................... C03B 7/10 65/163 |
| 5,303,515 | A | * | 4/1994 | Etcheparre .............. B24B 3/361 451/421 |
| 5,921,163 | A | * | 7/1999 | McInnes .................. B26D 3/30 83/167 |
| 2006/0101964 | A1 | * | 5/2006 | Serrra Obiol ........... B26F 1/384 83/346 |
| 2006/0179989 | A1 | * | 8/2006 | James ...................... B26D 1/24 83/284 |
| 2006/0196336 | A1 | * | 9/2006 | Ferrin .................. B26D 7/0608 83/932 |
| 2008/0250908 | A1 | * | 10/2008 | Totani ...................... B26D 5/08 83/76 |
| 2011/0000991 | A1 | * | 1/2011 | Takakura ............. B23D 31/008 241/63 |
| 2013/0279963 | A1 | * | 10/2013 | Shida ....................... B26D 5/02 400/621 |
| 2014/0116215 | A1 | * | 5/2014 | Kwarta .................... B26D 9/00 83/76.1 |
| 2015/0174778 | A1 | * | 6/2015 | Baba ...................... B26D 7/025 83/452 |
| 2017/0087889 | A1 | * | 3/2017 | Kikuchi .................... B41J 2/01 |

FOREIGN PATENT DOCUMENTS

| | | | |
|---|---|---|---|
| EP | 1520649 A2 | | 4/2005 |
| EP | 1749672 A1 | | 2/2007 |
| FR | 37300 | * | 3/1929 ............... B26D 1/08 |
| FR | 37300 E | | 11/1930 |
| GN | 201618883 U | | 11/2010 |
| WO | 9500301 A1 | | 1/1995 |

* cited by examiner

ELECTROMECHANICAL SHEARS FOR VERTICAL CUTTING

CROSS-REFERENCE TO RELATED APPLICATIONS

This application is a national phase filing under 35 U.S.C. 371 of International Application No. PCT/GR2019/000069, filed on Oct. 11, 2019, which claims the benefit of GR 20180100465, filed on Oct. 12, 2018 and in GR 20190100068, filed on Feb. 6, 2019. The contents of the aforementioned applications are incorporated by reference herein in their entirety.

The present disclosure relates to electromechanical shear or scissors for vertical cutting of metal sheets. This machine has the ability to change the cutting angle and the angle between the knives of the shear by using pulleys and motion transmission systems.

In the past, there were vertical cutting shears in which the energy of cutting was electrical or hydraulic energy transformed into mechanical energy in the form of inertia of a rotating element of significant mass. These shears were not capable of changing the cutting angle, which limited their usefulness. They also required the management and processing of very large masses, which made production difficult. Such a machine is described in CN201098912Y.

Also to date, the vertical cutting shears have been electric or hydraulic. The electric shears are operated by a three-phase induction motor, which operates both during cutting and during standby time. Alternatively, said shears have a start-stop function which results into consuming more power during consecutive startups. Such a shear is described in CN201618883U. Any of the two ways of functioning wastes energy, produces a lot of noise during idle time and burdens the environment.

In the case of hydraulic vertical cutting shears, there are mainly two types. In the first type the hydraulic means are used only as cutting power. In the second type the hydraulic means are additionally used to both adjust the cutting angle and the angle between the knives of the shears. Such systems are described in BE902287 and U.S. Pat. No. 3,282,141A, GB1096225, respectively. These types of shear most often exert uncontrollable force on the cutting blades, reducing the quality of the cut. The above systems also prevent the independent set-up of the shearing angle and the angle between the knives of the shear.

The present description is intended to provide a solution to all the above limitations.

The electromechanical vertical cutting shear comprises an electric servomotor combined with a gear reducer, at least one shaft bearing one or more spools, at least one motion transmission means which is connected to a guillotine, and a cutting system comprising at least a pair of knives. The electromechanical shear further comprises a pulley system cooperating with every motion transmission means. In that way the electromechanical shear can be set up more easily and in less time, allowing for cutting sheets of different thickness and material in a more efficient way. Also, the servomotor needed to provide the required cutting power is smaller, since the power it generates is multiplied by the multiple pulley systems, thus saving energy.

The pulley system of the electromechanical vertical cutting shear comprises at least 5 pulleys. In this way the shear becomes more efficient. In addition, in case of a fail of a part, for example of a pulley, the shear is able to continue cutting until the one pulley is replaced.

The pulley system adjusts the angle formed between the pair of knives. In order to succeed that, the pulley system has additional auxiliary spools, and the change of the angle can be done by moving asynchronously the motion transmission means around the auxiliary spools. This allows the machine to be used for cutting material in the form of a plate of different thickness, saving energy and respecting the environment since it is not necessary to handle oil waste that would be used in a machine with a corresponding hydraulic system. It is also a more cost-effective solution and allows for lower maintenance of the machine while allowing the machine operator to use his experience. In addition, since all the moving means of the machine are intensely moving only during the cutting operation of the material plates, the noise produced during operation is significantly lower than that produced by existing machines of this kind. This reduces noise pollution indoors.

The electromechanical vertical cutting shear comprises a guillotine retraction system, which can use compression springs or a hydraulic or a pneumatic system for the retraction of the guillotine to its starting position. In this way the use of the machine is easier for the operator, who does not have to retract the guillotine manually. Also, it is safer for the operator, since it is not required for him/her to go close to the machine during its operation.

The method of sheet material cutting using an electromechanical vertical shear evolves according to the following cycle:
  The first moving phase in which the guillotine moves between its idle position and the start of cutting,
  the cutting phase and
  the returning phase in which the guillotine returns to its starting position.

According to this method, during the period between two consecutive cutting cycles all parts of the electromechanical shear remain in standby mode. This allows the moving parts of the electromechanical shear to move when cutting and remain still or move slowly while they are in standby mode, reducing the wear of the moving parts of the shear, minimizing unnecessary power consumption and significantly reducing the noise produced.

The described electromechanical vertical cutting shear, hereinafter referred to as "shear", comprises mechanical moving parts or motion transmission means, such as pulleys, straps, and chains that make it more durable, more environmentally friendly and at a lower acquisition cost. These elements, combined with continuous high performance and longer life, make the shear of lower cost to the potential users.

BRIEF DESCRIPTION OF THE FIGURES

The description above, as well as the following detailed description, will be better understood if read in conjunction with the accompanying figures. For the purposes of illustration, specific embodiments of the present specification are shown in the figures. However, it should be understood that the present description is not limited to the specific version and features shown. The accompanying figures, which are included and form part of the description, illustrate the implementation of the devices according to this specification, and, together with it, serve to illustrate the advantages and the principles in accordance with this specification.

DETAILED DESCRIPTION

The phraseology and terminology used herein are for the purpose of the description and should not be considered limiting. For example, the use of the singular degree as "one" does not intend to determine the number of things. Also, the use of local pronouns such as 'up', 'down', 'left', 'right', 'side' etc. are used in the description for the sake of clarity of certain elements of the figures and are not intended to limit the scope of this description or of the accompanying claims. In addition, it should be understood that any of the features of the present specification may be used independently or in combination with other features. Other functional equivalent systems, methods, features, uses, and advantages of the present specification will be apparent to one skilled in the art through examination of the drawings and the description. All additional systems, methods, features, uses, and advantages are intended to be within the scope of this specification and to be protected from the range of accompanying claims.

Figure 1:
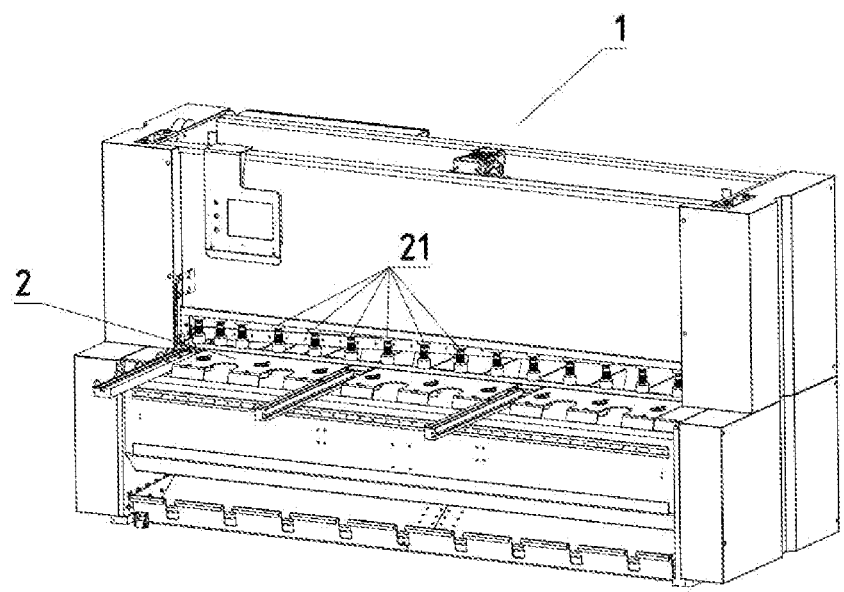
FIG. 1 shows a perspective view of the electromechanical shear.

The shear or scissors (1) of the present description, as shown in FIG. 1, comprises a table (2), which serves to support and hold, the sheet of material to be cut. The shear is preferably designed to cut a sheet of almost any material, of thickness between 0.1 mm and 50 mm. The sheet can be held in place in a variety of mechanical, magnetic or electromagnetic ways, such as by clamping or magnet mounting. The way the sheet is held in a stable position is not part of the present application.

Figure 2:
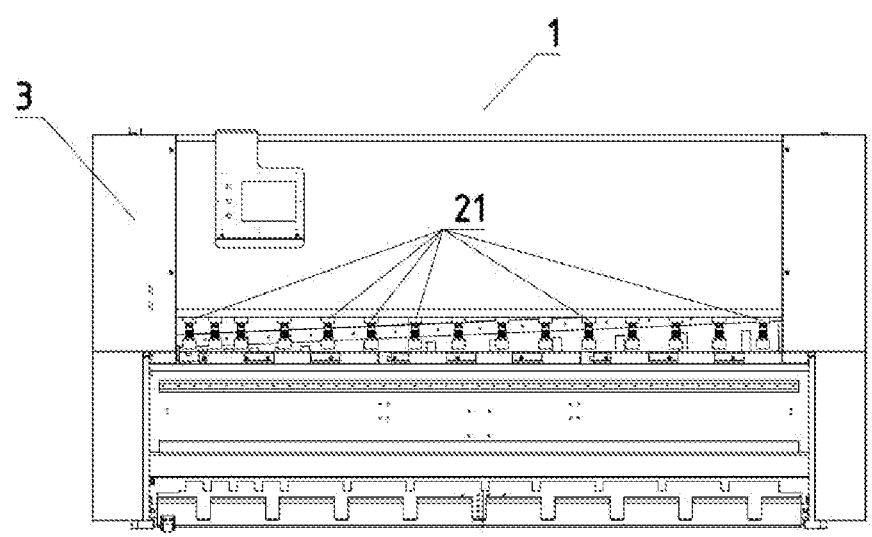
FIG. 2 shows an example of the front view of the electromechanical shear.

FIGS. 1 and 2 show the retention points (21) of the sheet to be cut. The shear further comprises a housing (3).

Figure 3A:
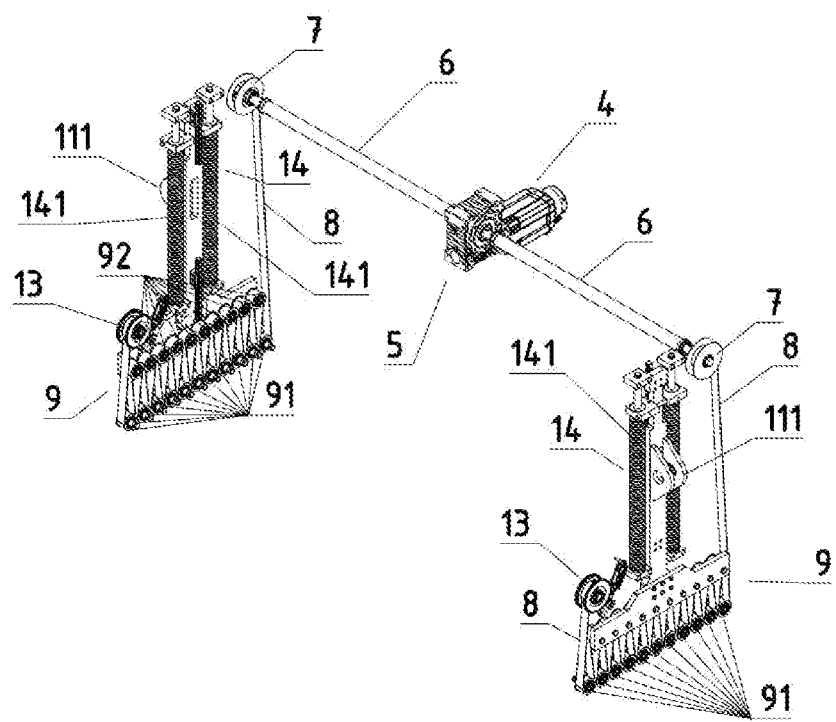
FIG. 3A shows a perspective view of the shear's mechanism.
Figure 3B:
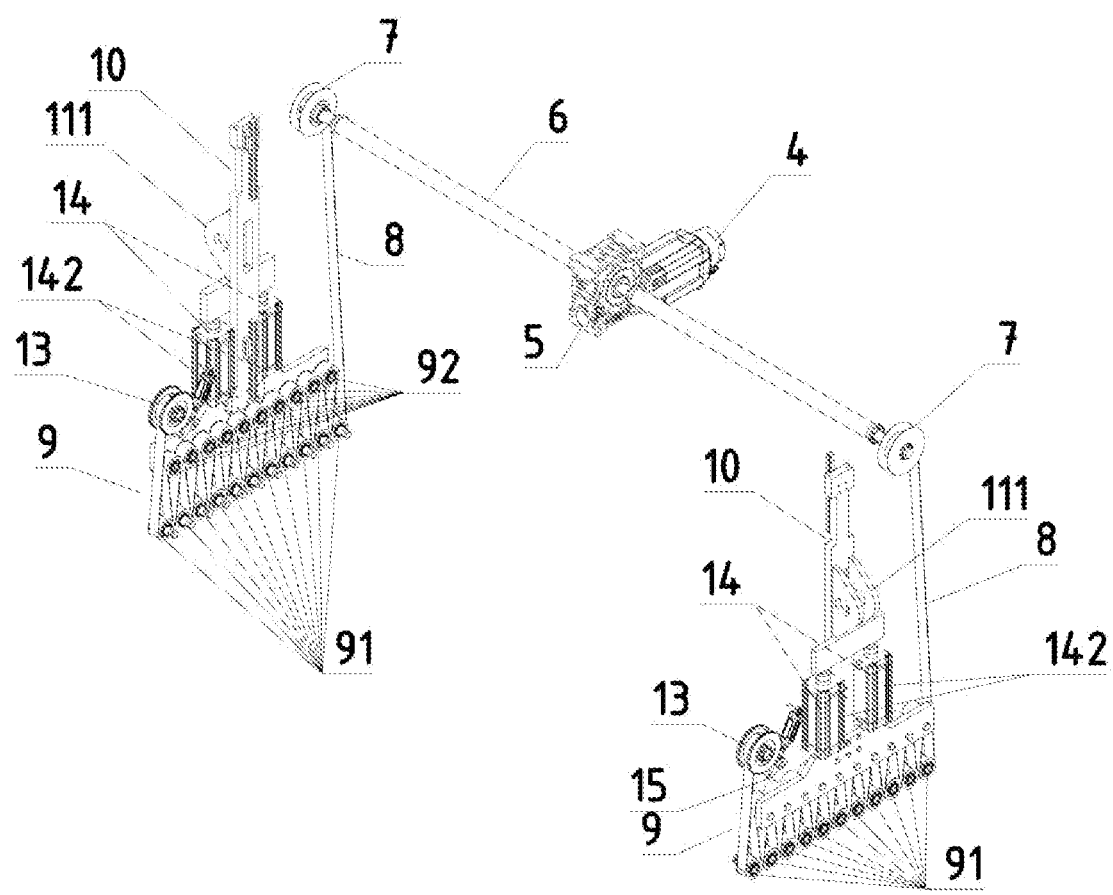
FIG. 3B shows another example of a perspective view of the shear's mechanism with a different retraction system.

FIGS. 3A and 3B show additional details of the cutting shear. An electric servomotor (4) is suitable for producing the cutting force. The servomotor (4) is coupled to a gear reducer (5). A person skilled in the art may understand that the selection and size of the servomotor (4) and gear reducer (5) may depend on the thickness and the material of the sheet to be cut. For this reason, a higher power servomotor (4) and a corresponding gear reducer (5) should be selected for cutting thicker sheets and of tougher material.

At the output of the gear reducer (5) is attached a metal shaft (6). The metal shaft (6) is capable of carrying all the torsional load necessary for cutting with very small distortions. Although the gear reducer (5) may be connected to the shaft (6) at any point along the shaft (6), the connection near the middle of the shaft (6), as shown in FIG. 3A, is preferable, as it assists in achieving an even distribution of torsional loads and the elongation of the shaft's (6) life. The choice of the diameter and the material of the shaft (6) is depended on the torsional load that it will carry. Usually the shaft (6) is made of steel of 37-52 dN/mm2, and its diameter can range between 40 mm and 250 mm. In any case, the person skilled in the art can select the shaft (6) of the most suitable properties.

At least two winding spools (7) are mounted on each end of the shaft (6), hereinafter referred to as spools. The spools (7) may be placed in any position on the shaft (6), but for a more even distribution of the load on the shaft (6) it is preferable that the two spools (7) are symmetrical about the joining point of the gear reducer (5) with the shaft (6). The diameter of each spool depends on the torsional load that the spool will have to convert to displacement and usually it varies between 100 mm and 400 mm.

Each of the spools (7) bears wrapped around it one or more motion transmission means (8). The purpose of the motion transmission means (8) is to transfer and convert the rotating force—torque from the shaft (6) to a displacement of the sheet cutting means, or guillotine (numbered (11) in FIG. 5). Each spool (7) is configured to work with the corresponding motion transmission means (8).

Figure 4:
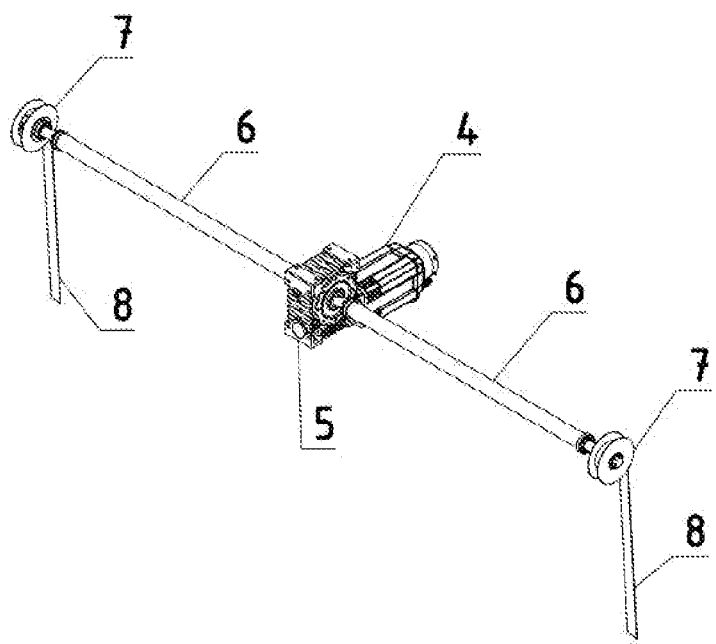
FIG. 4 shows the shaft and the bearing spools.

As shown in FIG. 4, the motion transmission means (8) is a belt or a elastic ribbon, so that the spool (7) can be in the form of a pulley. In another example each spool (7) is in the form of a pulley and cooperates with two motion transmission means (8) being in the form of a flat belt. In yet another example, not shown in the figures, the motion transmission means (8) has the form of a chain and the spool (8) has the form of a gear. It is not necessary that all spools (7) have the same configuration and that all motion transmission means (8) are the same, but a person skilled in the art may understand that uniformity leads to a smoother operation of the shear (1) and prolonging its life. The motion transmission means (8) are of adequate tensile strength and the spools (7) are capable of accepting all the required length of the motion transmission means (8) that should be wrapped around the spools (7) in order to achieve cutting.

Figure 5:
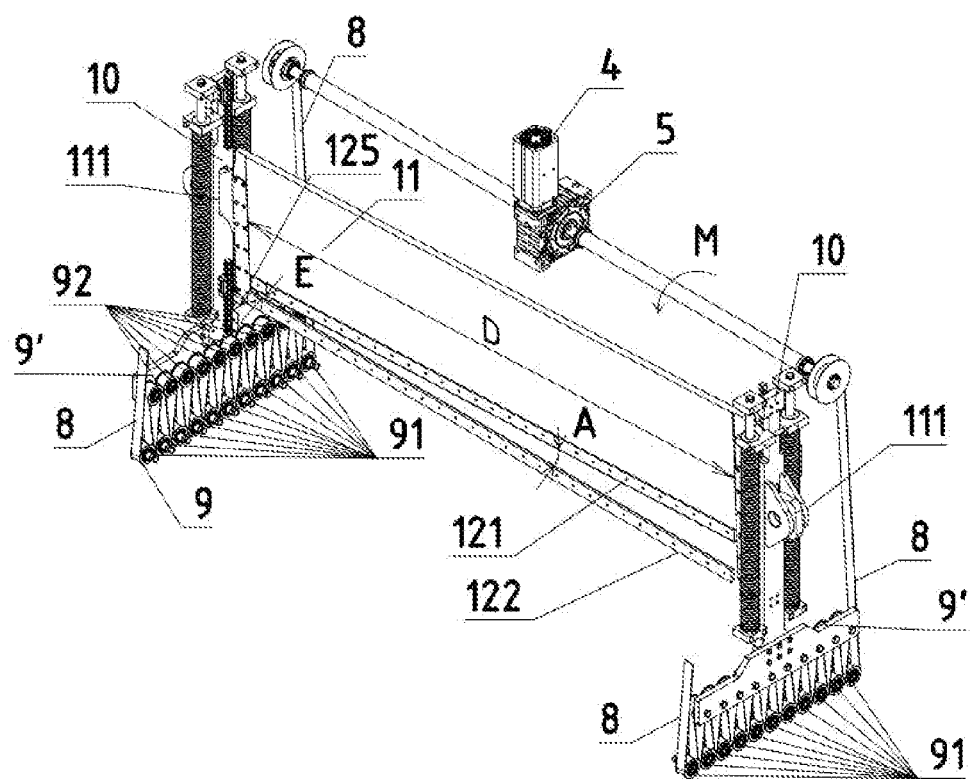
FIG. 5 is an inner view of the electromechanical shear and shows the attachment of the guillotine to the carrier.

As shown in FIG. 5, each motion transmission means (8) will then pass through two pulley systems (9, 9'). These pulley systems (9) may comprise from 3 to 19 pulleys each, each may preferably comprise more than 5 pulleys. The system of pulleys is known by Archimedes for the propagation of force and is referred to in modern literature as a "pulley tackle". The pulley system of the present invention comprises stationary pulleys (91) and moving pulleys (92), shown both in FIGS. 3A and 5.

The stationary pulleys (91) are fastened to the housing (3). The moving pulleys (92) are connected to a carrier (10) which can move vertically. Attached on the carrier (10) is the guillotine (11) of the shear (1).

Figure 6A:
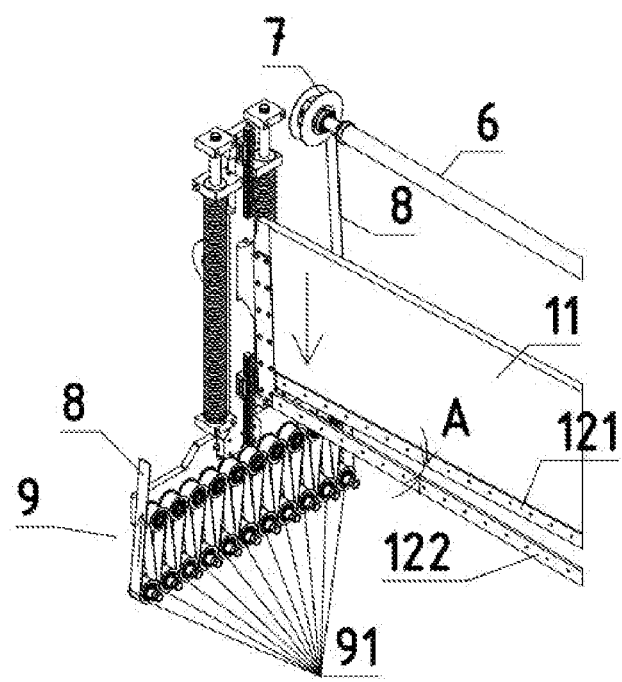
FIG. 6A shows in detail the pulley system for adjusting the angle between the knives where the motion transmission means is mounted on the last stationary pulley.
Figure 6B:
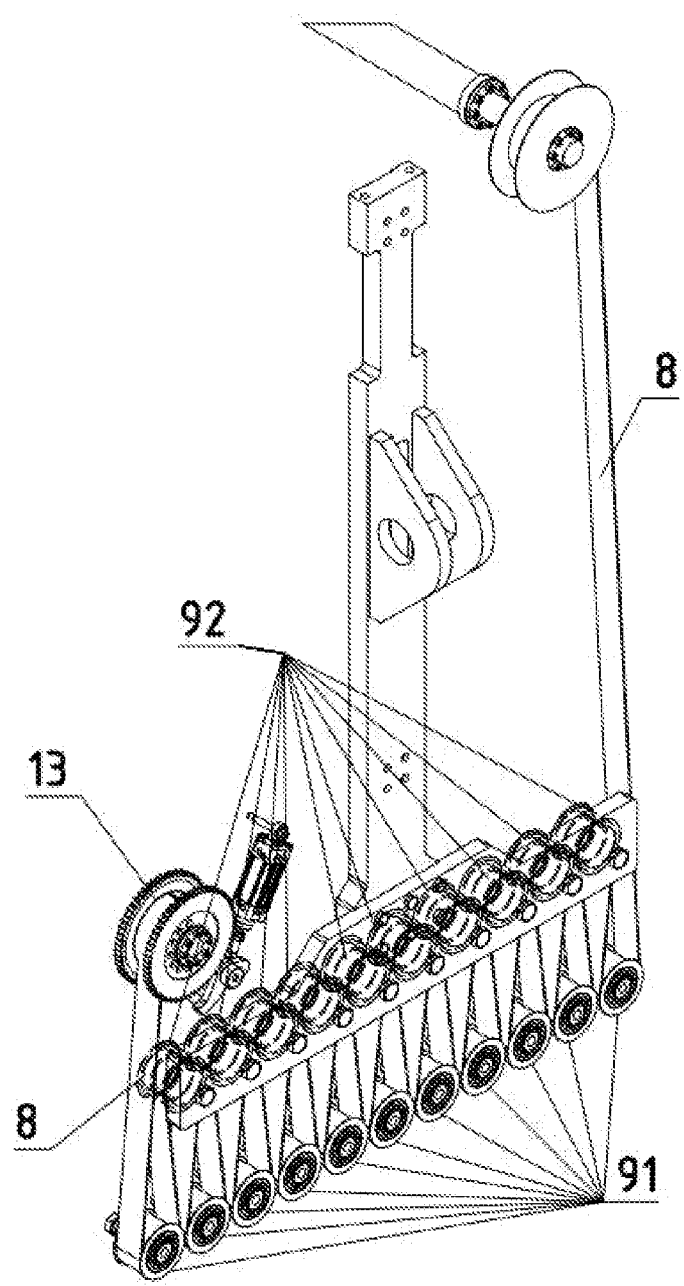
FIG. 6B shows in detail the pulley system for adjusting the angle between the knives where the motion transmission means is mounted on the auxiliary spool.

In one embodiment of the present invention, one end of the motion transmission means (8) is mounted on the spool (7), passes through the pulley system (9), and its other end is mounted, at the end of the way, in one of the pulleys (91) or (92) as shown in FIG. 6A. Alternatively, as shown in FIG. 6B, it may be mounted on an auxiliary spool (13) which belongs to the pulley system (9). The purpose of the auxiliary spool (13) is to adjust the cutting angle, which is the angle between the knives (121, 122) and the sheet to be cut.

In the preferred embodiment of the present invention the shear (1) comprises a cutting system consisting of one pair of knives. As shown in FIG. 5, one knife (121) of the pair is attached to the guillotine (11) and follows its movement. In another example of realisation, not shown herein one knife (121) may be mounted in notches on the housing (3) so that it can move and be retracted by the guillotine (11).

The second knife (122) of the pair is fixed onto the housing (3) and is stationary. Alternatively, it is able to move in order to approach the first knife (121) of the pair. In FIG.

5 is shown the position of the second knife (122), but the housing (numbered (3) in FIG. 1) is omitted. The distance between the two knives has its minimum at one of the two ends of the shears (denoted as (E) in FIG. 5). This minimum distance determines also the maximum thickness of the sheet that the shears can cut. The point where the two knives (121, 122) are met is the initial point of cutting (125).

The user may wish to move the initial point of cutting (125) to a different point. The aim is to bring closer the knives for decreasing the cutting distance D (FIG. 5) and save time. An additional reason for changing the initial point of cutting (125) is the reduction of the knife wear, so the knives have a longer life. If the cutting distance D is reduced, the length of each knife (121, 122) that will be used for cutting will be reduced as well, so the knife wear will be limited to the used length of the knives (121, 122). The change of the cutting origin (125) can be done simply by wrapping equal lengths of the motion transmission means (8) around the auxiliary spools (13). The auxiliary spools (13) can be rotated by an electric motor and a gear reducer, or they can be manually operated.

The cutting is done by the first knife (121) which is attached on the guillotine (11) and the second knife (122) of the shear. The pulley systems (9) may exert force only in one direction, and in this case, towards the cutting origin. The guillotine (11) retraction to its starting position may be done by a guillotine retraction system (14), for example by a mechanical system using compression springs (141), as shown in FIG. 3A, by a hydraulic system (142) shown in FIG. 3B, or by another similar mechanism, for example by nitrogen springs. However, the mechanical way for ascending the guillotine (11) may provide an increased safety to the user. In any failure, the guillotine will move upwards, driven by the force of the springs.

The ratchet mechanism (15) shown in FIG. 5, serves to withstand the large forces which are developed during the cutting. It would be expensive to use a bigger gear to drive the auxiliary spool (13). Instead of the ratchet mechanism (15), another similar mechanism may perform the same task.

The operation method of the shear (1) disclosed herein is described below.

The shear (1) uses at least one servomotor (4), a gear reducer (5), a shaft (6), spools (7), motion transmission means (8), pulley systems (9), a carrier (10), a guillotine (11), a guillotine retraction system (14) and a pair of knives (12) for cutting sheets.

The sheet to be cut is fixed on the table (2). The servomotor (4) is started, and, through the gear reducer (5), the shaft (6) begins to rotate.

When the shaft (6) is turned in the direction (M) as shown in FIG. 5, the spools (7) coil each motion transmission means (8), so that the moving pulleys (92) move towards the stationary pulleys (91) while dragging the carrier (10) and driving the guillotine (11) to the final cutting position with the necessary cutting force. In this position, the knife (121) which is connected to the guillotine (11) approaches forcefully the other knife (122) of the pair, and the sheet is cut.

In order for the guillotine (11) to achieve a speed of between 30 and 200 mm/sec, which is sufficient for cutting, the rotation speed of the shaft does not need to exceed 600 rpm, or even 500 rpm. This results in significantly reduced noise levels. Indicatively, in a modern hydraulic shear, the noise produced during cutting was measured at between 70 dB and 80 dB, while the noise produced during cutting with an electromechanical shear performed according to the present disclosure was between 50 dB and −60 dB. The servomotor (4) rotates counterclockwise in order to loosen the tensile force exerted on the motion transmission means (8). The guillotine retraction system (14) exerts a force on the carrier (10), on which the guillotine (11) is attached at the mounting point (111). This force is greater than the force exerted on the carrier (10) by the motion transmission means (8), so the carrier (10) moves, driving the guillotine (11) to its starting position. In this process the shaft (6) receives the cutting force from its point of production and distributes it mechanically at the pulley systems (9), while maintaining the individual percentages required each time frame for the cutting. This means that all of the initially generated force can be transferred entirely to the one or to the opposite end point of the guillotine (11) when required by the cutting. Therefore, the utilization of the power of the servomotor (4) is at 100%, which results in significant energy savings and an increase of the cutting speed.

While the cut sheet is removed and a new sheet to be cut may be fixed in place, the shear (1) are in a standby mode. In this mode the movable parts of the shear (1) and the servomotor (4) remain idle, or move slowly due to their inertia. Consequently, the shear (1) remain silent, or almost silent, while saving energy as well. On the contrary, a hydraulic shear produces noise due to the rotation of the motor and the pump fitted to its shaft, even when it is idle.

Another advantage of the present invention is that through the ability to change the cutting angle, we extend the shear's functionality, we extend the useful life of the knives and improve the quality of cutting. The cutting angle may be changed by wrapping, or unwrapping, asynchronously the motion transmission means (8) around the auxiliary spools (13), thereby changing the angle of the guillotine (11), and the position of the first knife (121) connected therewith, in relation to the fixed knife (122).

Preferably, the cutting angle is changed when the shear (1) is in a standby mode.

The invention claimed is:

1. An electromechanical shear for vertical cutting of a sheet of material, the electromechanical shear comprising:
    a housing;
    a carrier mounted to the housing for undergoing vertical displacement;
    a cutting system having a guillotine mounted to the carrier for undergoing vertical displacement with the carrier from an idle position of the guillotine to a cutting position of the guillotine, and a first knife mounted for undergoing vertical displacement with the guillotine relative to a second knife for cutting a sheet of material;
    a shaft mounted relative to the housing for undergoing rotation;
    an electric servomotor for producing a cutting force by the first and second knives;
    a gear reducer coupled to the electric servomotor and having an output to which the shaft is attached for undergoing rotation;
    first and second winding spools, each of the first and second winding spools mounted to each end of the shaft;
    a series of pulley systems, wherein an individual pulley system is associated with each winding spool; and
    motion transmission means associated and cooperating with each winding spool and each pulley system for transferring and converting rotation of the shaft to vertical displacement of the guillotine for vertical cutting of the sheet of material by the first and second knives.

2. The electromechanical shear of claim 1, wherein each pulley system comprises at least five pulleys.

3. The electromechanical shear of claim 1, wherein each pulley system comprises stationary pulleys connected to the housing and moving pulleys connected to the carrier for allowing the moving pulleys to undergo vertical displacement with the carrier.

4. The electromechanical shear of claim 1, wherein each pulley system further comprises an auxiliary spool configured for cooperation with a corresponding one of the motion transmission means for adjusting a cutting angle between the first and second knives and the sheet of material.

5. The electromechanical shear of claim 4, wherein each of the motion transmission means is configured for undergoing asynchronous movement around respective ones of the auxiliary spools to change an angle formed between the first and second knives.

6. The electromechanical shear of claim 1, wherein each motion transmission means comprises a belt.

7. The electromechanical shear of claim 1, further comprising a guillotine retraction system for retracting the guillotine from the cutting position.

8. The electromechanical shear of claim 7, wherein the guillotine retraction system comprises compression springs.

9. The electromechanical shear of claim 7, wherein the guillotine retraction system comprises a pneumatic or hydraulic system.

10. The electromechanical shear of claim 1, wherein the gear reducer is mounted on a portion of the shaft; and wherein winding spools are mounted so as to be symmetrical about the portion of the shaft on which the gear reducer is mounted.

11. The electromechanical shear of claim 10, wherein the gear reducer is mounted near the middle of the shaft.

12. The electromechanical shear of claim 1, wherein the first knife is mounted to guillotine for vertical displacement with the guillotine, and the second knife is fixedly mounted to the housing so as to be stationary relative to the first knife.

13. The electromechanical shear of claim 1, wherein each motion transmission means comprises a belt configured for wrapping around the corresponding winding spool when the shaft rotates during a cutting operation of the shear; and wherein each pulley system comprises two sets of pulleys cooperating with the respective winding spools via the corresponding belt during a cutting operation of the shear.

14. The electromechanical shear of claim 1, wherein each of the motion transmission means is configured to be wrapped and unwrapped asynchronously around a corresponding auxiliary spool for adjusting an angle of the first knife relative to the second knife to change a cutting angle of the sheet of material.

* * * * *